J. SHEER.
Corn-Planters.
No. 135,942. Patented Feb. 18, 1873.
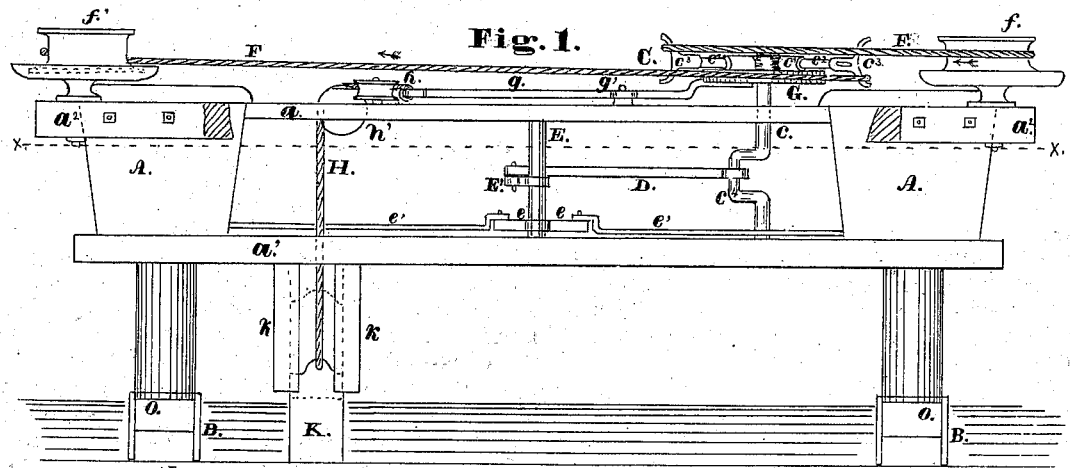
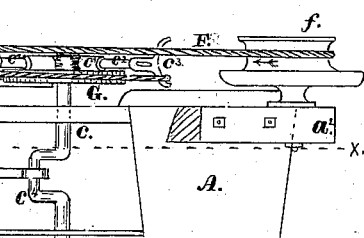
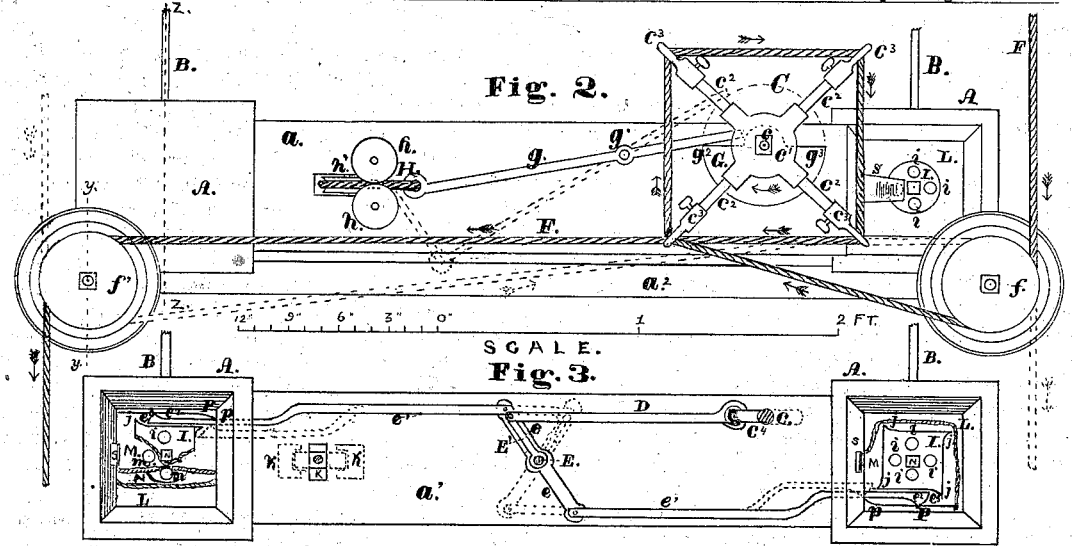
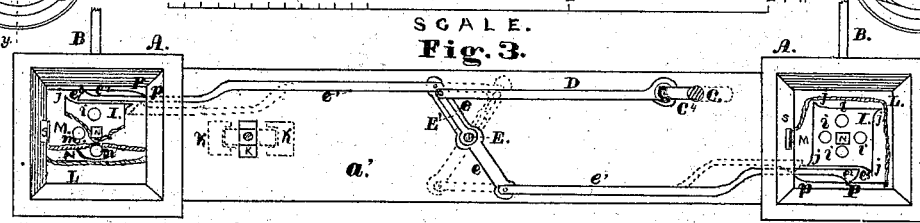
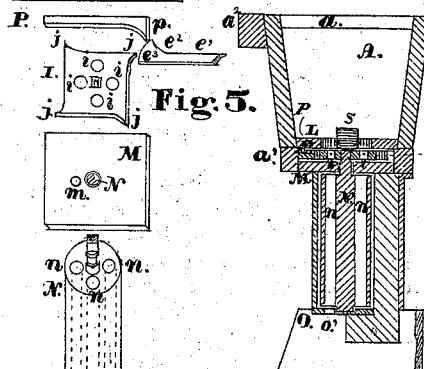
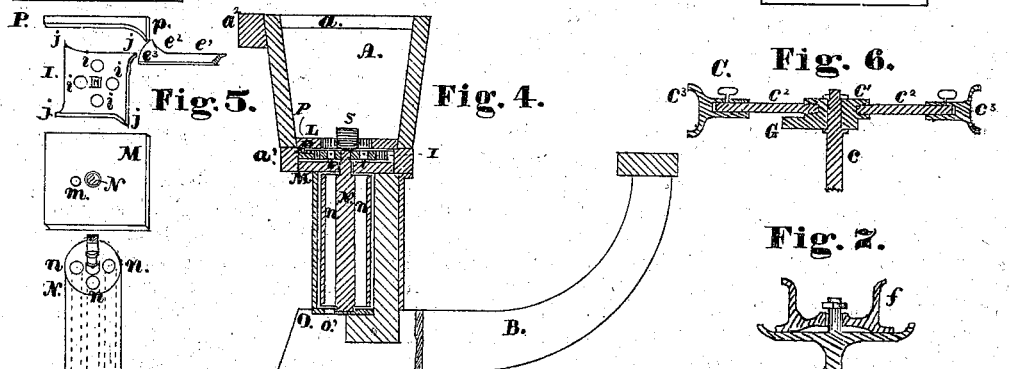
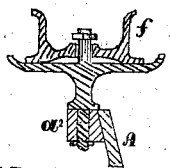
WITNESSES:
Albert H. Southwick
Edwin N. Lapham
INVENTOR:
JOHN SHEER.
per Charles P. Housum,
HIS ATTORNEY.
AM. PHOTO-LITHOGRAPHIC CO. N.Y. (OSBORNE'S PROCESS.)

UNITED STATES PATENT OFFICE.

JOHN SHEER, OF LINCOLN, ILLINOIS.

IMPROVEMENT IN CORN-PLANTERS.

Specification forming part of Letters Patent No. 135,942, dated February 18, 1873.

*To all whom it may concern:*

Be it known that I, JOHN SHEER, of Lincoln, in the county of Logan and State of Illinois, have invented certain Improvements in Corn-Planters, of which the following is a specification:

My invention relates to an improvement in corn-planters; and consists, first, in an automatic device operated with a cord stretched across the field and dropping the corn at regular distances apart in check-rows; and, second, an automatic marker marking the ground at the same time the corn is dropped as a guide to commence by in planting subsequent rows; and, third, in the form and mode of operation of the seed-slide, and a shaft through which the corn passes to the lower plate, as is more fully described.

Figure 1 is a rear elevation of the seeding part of a corn-planter, and embodies my invention. Fig. 2 is a plan of the same; Fig. 3, a transverse section taken through the dotted lines $x\, x$, Fig. 1. Fig. 4 is a vertical section taken through the dotted lines $z\, z$, Fig. 2; Fig. 5, perspective views of the different parts of the seed-dropping apparatus; Fig. 6, a section of reel; and Fig. 7, a section of pulley taken through the dotted lines $y\, y$, Fig. 2.

A A are the seed-boxes; $a\, a^1$, the upper and lower part of the frame that supports the same. B B are the furrow-shares. C is a reel on the shaft $c$, having bearings in the frame $a\, a^1$. This reel consists of a hub, $c^1$, and the arms $c^2\, c^2$ are threaded and screw therein. The forks $c^3\, c^3$ slide over and are fastened on the ends of the arms with set-screws; or the end of the arm can be threaded, and the forks screwed thereon. At every revolution of the reel the corn is dropped; as, in the drawing, the distance from one fork to the other is 11 inches, making the circumference of the reel 33.+ inches, which can be increased or diminished by means of the devices described, and drop the corn at any distance apart that is desired—viz., the sliding of the forks on the arms and the adjustment with the set-screw, or by the ends of the arms threaded and screwing into the hub, as shown in Fig. 6, or into the forks. The shaft $c$ has a crank, $c^4$, to which is attached a pitman, D. E is a shaft having bearings in the frame $a\, a^1$. On this shaft is a crank, E′, to which the pitman is attached. $e\, e$ are arms, and to these arms are attached the rods $e^1\, e^1$ that operate the seed-slides I I. The reel is operated with a rope, F, which is anchored at each end of the field, not straight across, but angling the distance of the rows apart. The rope passes on the pulley $f$, and thence around the reel; thence on the pulley $f'$, and to the end of the field. The pulleys $f\, f'$ are supported on a transverse piece, $a^2$, fastened to the seed-boxes. G is a cam. It is a part of the hub $c^1$, as they can be both cast in one piece. This cam operates a lever, $g$, having its fulcrum at $g^1$. At the end of this lever is attached a cord or chain, H, that passes between the pulleys $h\, h$, as is shown in Fig. 2. It also passes over a pulley, $h'$, in a slot in the frame $a$, and thence down through a slot in the frame $a^1$, and is attached to a piece or marker, K, that slides in the perpendicular pieces $k\, k$ that are attached to the frame $a^1$.

As the reel is revolved, and the lever $g$ in the position shown in Fig. 2, the marker is in the ground; and when the point $g^2$ strikes the lever it is forced over so that the marker is raised and held until the lever drops off of the point $g^3$. The marker is heavy enough to fall of its own weight as soon as the lever is released and sinks into the plowed ground, where it makes a mark.

When the machine is going in the opposite direction from that shown in the drawing, (the top of the drawing being the front,) the rope F is placed on the pulleys $f\, f'$, as shown by the dotted lines in Fig. 2, and the reel turns to the left, the lever $g$ striking on the point $g^3$ to raise the marker, and dropping off of the point $g^2$.

L is a plate, with a circular opening in the bottom large enough so that the four cells $i\, i\, i\, i$ in the seed-slide I shall be exposed. The seed-slide is square with points $j\, j\, j\, j$ on the corners. $s$ is a spring cut-off. A plate, M, is under the seed-slide, with one opening, $m$, directly under the spring $s$. N is a circular shaft, with four seed-channels, $n\, n\, n\, n$. (See Fig. 5.) This shaft has a bearing in the plate M, and also in the plate O at the bottom of the shaft. This plate has an opening, $o'$. P is a piece between the plates L and M, with a point, as shown at $p$.

The seed is dropped as follows: The position of the parts in Fig. 3 is as when the corn has just been dropped, and as the rods $e^1$ $e^1$ are drawn inward, as shown by the dotted lines, the concave part $e^2$ of the rod $e^1$ allows the rod to be drawn nearly straight until it reaches the point $e^3$, when, by the point $p$, it is pushed over enough so that as the rod is moved back again the point $e^3$ will strike against the point $j$, (see Fig. 5,) and carry the seed-slide around a quarter of a revolution, and leave it in the position shown in Fig. 3, and the operation is repeated. This seed-slide is fastened to the top end of the shaft N, and the shaft is carried around with it so that the seed that is deposited in the seed-channel $n$ that is under the spring $s$ is carried one quarter of a revolution, when it is dropped through the opening $o'$ in the lower plate O to the ground.

The seed-slide, rods $e^1$ $e^1$, the shaft N, and the parts composing the drop can also be used on a corn-planter where it is designed to drop by a hand-lever, and said lever can be attached to the crank E′, and have its fulcrum in the piece $a$; so I do not wish to confine the seed-dropping mechanism to an automatic planter.

I claim as my invention—

1. The reel C, consisting of the hub $c^1$, arms $c^2$ $c^2$ $c^2$ $c^2$, and forks $c^3$ $c^3$ $c^3$ $c^3$, so as to increase or diminish the circumference of the reel, substantially as described, and for the purpose set forth.

2. The combination of the reel C, shaft $c$, crank $c^4$, pitman D, shaft E, crank E′, arms $e$ $e$, and rods $e^1$ $e^1$ with the cord F and pulleys $f$ $f'$, substantially as described, and for the purpose set forth.

3. The cam G, lever $g$, cord or chain H, pulleys $h$ $h$ $h'$, marker K, and grooved pieces $k$ $k$, substantially as described, and for the purpose set forth.

4. The shaft N with the seed-channels $n$ $n$ $n$, in combination with the plates L, M, and O, seed-slide I, piece P, and rod $e^1$, as shown and described, and for the purpose set forth.

JOHN SHEER.

Witnesses:
CHARLES P. HOUSUM,
THOMAS LEE.